United States Patent
Lamb et al.

(10) Patent No.: US 10,647,454 B2
(45) Date of Patent: May 12, 2020

(54) SMART PACKAGING WALL

(71) Applicant: Packsize LLC., Salt Lake City, UT (US)

(72) Inventors: Thomas Lamb, Syracuse, UT (US); David Iverson, Magna, UT (US); Adam De Laveaga, Ridgefield, WA (US); Ryan Osterhout, West Haven, UT (US); John McCracken, Cottonwood Heights, UT (US); Gary Moe, South Jordan, UT (US); Niklas Pettersson, Västerås (SE)

(73) Assignee: Packsize LLC, Salt Lake City, UT (US)

( * ) Notice: Subject to any disclaimer, the term of this patent is extended or adjusted under 35 U.S.C. 154(b) by 153 days.

(21) Appl. No.: 15/652,518

(22) Filed: Jul. 18, 2017

(65) Prior Publication Data

US 2018/0022493 A1  Jan. 25, 2018

Related U.S. Application Data

(60) Provisional application No. 62/365,710, filed on Jul. 22, 2016.

(51) Int. Cl.
*B65B 5/02* (2006.01)
*B65B 43/08* (2006.01)
(Continued)

(52) U.S. Cl.
CPC .............. *B65B 5/024* (2013.01); *B65B 43/00* (2013.01); *B65B 43/08* (2013.01); *B65B 57/12* (2013.01);
(Continued)

(58) Field of Classification Search
CPC .................................................. B65B 2210/04
See application file for complete search history.

(56) References Cited

U.S. PATENT DOCUMENTS

| | | | |
|---|---|---|---|
| 6,431,362 B1 | 8/2002 | Araki et al. | |
| 6,594,535 B1 * | 7/2003 | Costanza | G05B 19/41865 700/97 |

(Continued)

FOREIGN PATENT DOCUMENTS

| | | |
|---|---|---|
| WO | 2014117822 | 8/2014 |
| WO | 2015020974 | 2/2015 |
| WO | 2016053747 | 3/2016 |

OTHER PUBLICATIONS

International Search Report and Written Opinion for application No. PCT/US2017/042728 dated Nov. 30, 2017.

*Primary Examiner* — Thomas Randazzo
(74) *Attorney, Agent, or Firm* — Workman Nydegger

(57) ABSTRACT

A packaging system for high flexibility and speed box-last packaging comprises one or more dimensional scanning sensors that are configured to scan a group of one or more target products that are to be boxed and gather dimension information describing physical dimensions of the group of one or more target products. The system also comprises one or more packaging-production machines that are configured to generate custom-made packaging templates that conform to a pre-determined set of packaging template types. Additionally, the system comprises a packaging template buffer that comprises physically divided sections that contain multiple packaging templates selected from the pre-determined set of packaging template types that are generated by the one or more packaging-production machines. Each of the packaging templates are organized within the physically divided section based upon packaging template type.

19 Claims, 5 Drawing Sheets

(51) Int. Cl.
*B65B 43/00* (2006.01)
*B65B 59/00* (2006.01)
*B65B 57/12* (2006.01)
*B65B 65/00* (2006.01)
*G05B 19/18* (2006.01)

(52) U.S. Cl.
CPC ............ *B65B 59/00* (2013.01); *B65B 65/003* (2013.01); *G05B 19/188* (2013.01); *B65B 2210/04* (2013.01); *G05B 2219/23261* (2013.01); *G05B 2219/45048* (2013.01)

(56) References Cited

U.S. PATENT DOCUMENTS

| | | | | |
|---|---|---|---|---|
| 2002/0014533 | A1* | 2/2002 | Zhu | B82Y 15/00 235/472.01 |
| 2004/0026300 | A1* | 2/2004 | Kibbler | B07C 1/02 209/579 |
| 2005/0114193 | A1 | 5/2005 | Kroening | |
| 2005/0192834 | A1 | 9/2005 | Yates | |
| 2006/0145101 | A1* | 7/2006 | De Coi | G01B 11/024 250/559.12 |
| 2007/0270991 | A1 | 11/2007 | Dye | |
| 2011/0295412 | A1 | 12/2011 | Hara et al. | |
| 2012/0273387 | A1 | 11/2012 | Ivosevic et al. | |
| 2013/0000252 | A1* | 1/2013 | Pettersson | B65B 5/024 53/396 |
| 2013/0247519 | A1* | 9/2013 | Clark | B65B 59/00 53/452 |
| 2014/0059981 | A1* | 3/2014 | Pettersson | B65B 5/024 53/504 |
| 2014/0351101 | A1* | 11/2014 | Danelski | G06Q 10/087 705/28 |
| 2015/0005926 | A1* | 1/2015 | Pettersson | B65B 59/00 700/228 |
| 2015/0019387 | A1* | 1/2015 | Pettersson | G06Q 30/0635 705/26.81 |
| 2015/0274333 | A1* | 10/2015 | Greyshock | B65B 57/12 53/473 |
| 2015/0360801 | A1* | 12/2015 | Sytema | B65D 5/6664 53/74 |
| 2016/0001441 | A1* | 1/2016 | Osterhout | B25H 1/02 108/5 |
| 2016/0125352 | A1* | 5/2016 | Tian | G06Q 10/04 53/445 |
| 2016/0151868 | A1* | 6/2016 | Attucci | B23P 19/001 700/219 |
| 2016/0185475 | A1* | 6/2016 | Pettersson | B65B 59/02 53/493 |
| 2016/0239775 | A1* | 8/2016 | Featherstone | G06Q 10/06313 |

* cited by examiner

SMART PACKAGING WALL

CROSS-REFERENCE TO RELATED APPLICATIONS

This application claims the benefit of and priority to U.S. Provisional Patent Application Ser. No. 62/365,710 filed on Jul. 22, 2016 and entitled "SMART PACKAGING WALL," which application is expressly incorporated herein by reference in its entirety.

BACKGROUND

Shipping and packaging industries frequently use paperboard and other fanfold material processing equipment that converts fanfold materials into box templates. One advantage of such equipment is that a shipper may prepare boxes of required sizes as needed in lieu of keeping a stock of standard, pre-made boxes of various sizes. Consequently, the shipper can eliminate the need to forecast its requirements for particular box sizes as well as to store pre-made boxes of standard sizes. Instead, the shipper may store one or more bales of fanfold material, which can be used to generate a variety of box sizes based on the specific box size requirements at the time of each shipment. This allows the shipper to reduce storage space normally required for periodically used shipping supplies as well as reduce the waste and costs associated with the inherently inaccurate process of forecasting box size requirements, as the items shipped and their respective dimensions vary from time to time.

In addition to reducing the inefficiencies associated with storing pre-made boxes of numerous sizes, creating custom sized boxes also reduces packaging and shipping costs. In the fulfillment industry it is estimated that shipped items are typically packaged in boxes that are about 40% larger than the shipped items. Boxes that are too large for a particular item are more expensive than a box that is custom sized for the item due to the cost of the excess material used to make the larger box. When an item is packaged in an oversized box, filling material (e.g., Styrofoam, foam peanuts, paper, air pillows, etc.) is often placed in the box to prevent the item from moving inside the box and to prevent the box from caving in when pressure is applied (e.g., when boxes are taped closed or stacked). These filling materials further increase the cost associated with packing an item in an oversized box.

Custom-sized boxes also reduce the shipping costs associated with shipping items compared to shipping the items in oversized boxes. A shipping vehicle filled with boxes that are 40% larger than the packaged items is much less cost efficient to operate than a shipping vehicle filled with boxes that are custom sized to fit the packaged items. In other words, a shipping vehicle filled with custom sized packages can carry a significantly larger number of packages, which can reduce the number of shipping vehicles required to ship that same number of items. Accordingly, in addition or as an alternative to calculating shipping prices based on the weight of a package, shipping prices are often affected by the size of the shipped package. Thus, reducing the size of an item's package can reduce the price of shipping the item.

In some circumstances, however, relying upon packaging-production machines to create custom sized packages can create bottlenecks and inefficiencies in the packaging work flow. For example, during busy seasons, the packaging-production machines may not be able to keep up with the flow of products. Similarly, due to the inability to ideally order and process packaging templates, the packaging machines may operate at below-peak efficiency during busy cycles. For example, in some cases it may take more time, but be more cost-effective to make multiple packaging templates at the same time. During busy cycles, the packaging machines may be forced to sacrifice cost efficiency in the interest of speed.

Although packaging-production machines and related equipment can potentially reduce inconveniences and costs associated with stocking and using standard sized shipping supplies, the process for making and using custom-made, just-in-time packaging templates can nevertheless be improved through the order in which the packaging templates are created and used.

BRIEF SUMMARY

Implementations disclosed herein comprise systems, methods, and apparatus configured to process paperboard (such as corrugated cardboard) and similar fanfold materials and converting the same into packaging templates. For example, disclosed embodiments include packaging systems where custom packaging templates are generated and stockpiled within a packaging template buffer. A properly managed buffer can alleviate bottlenecks and maximize the use of packaging-production machines. Accordingly, in at least one embodiment, a custom-to-fit box can be pre-made in anticipation of receiving a particularly sized order.

Disclosed embodiments include a method for high flexibility and speed box-last packaging. For example, the method includes receiving, from one or more dimensional scanning sensors, dimension information describing physical dimensions of a group of one or more target products that are to be boxed. The method also includes accessing, from a packaging database, a packaging inventory that comprises a listing of an available number of each respective packaging template types within a packaging template buffer. The packaging template buffer comprises packaging templates that are already manufactured and ready to be folded into boxes. Additionally, the method includes selecting a particular packaging template type that is associated with interior dimensions that are greater than or equal to the physical dimensions of the group of one or more target product. Further, the method includes communicating to a packaging-production machine a template creation command that directs the packaging-production machine to create a first packaging template that corresponds with the particular packaging template type. Further still, the method includes communicating to the packaging template buffer a template identification command that indicates which packaging template should be selected from the packaging template buffer. The packaging template buffer contains a second packaging template that also corresponds with the particular packaging template type. The template identification command causes the packaging template buffer to display to a user that the second packaging template should be constructed into a box.

Additional disclosed embodiments include a packaging system for high flexibility and speed box-last packaging. The system comprises one or more processors and one or more computer-readable media having stored thereon executable instructions that when executed by the one or more processors configure the computer system to perform various acts. For example, the system is configured to receive, from one or more dimensional scanning sensors, dimension information describing physical dimensions of a group of one or more target products that are to be boxed. The system is also configured to access, from a packaging database, a packaging inventory that comprises a listing of an available number of each respective packaging template type within a packaging template buffer. The packaging template buffer comprises packaging templates that are already manufactured and ready to be folded into boxes.

The system also is configured to access, from the packaging database, an order queue that comprises information about currently pending orders that need to be boxed. Additionally, the system is configured to receive, from one or more packaging-production machines, takt information. The takt information describes the amount of time required to complete one or more pending orders within the order queue. Further, the system is configured to automatically optimize the boxing of the group of one or more target products by selecting a particular packaging template type based upon the packaging inventory, the order queue, and the takt information. The particular packaging template type is associated with a particular production line selected from one or more production lines, the one or more production lines including a first production line that is associated with pre-manufactured packaging templates, and a second production line that is associated with packaging templates that are produced by the one or more packaging-production machines and stored within the packaging template buffer.

An additional embodiment comprises a packaging system for high flexibility and speed box-last packaging comprises one or more dimensional scanning sensors that are configured to scan a group of one or more target products that are to be boxed and gather dimension information describing physical dimensions of the group of one or more target products. The system also comprises one or more packaging-production machines that are configured to generate custom-made packaging templates that conform to a pre-determined set of packaging template types. Additionally, the system comprises a packaging template buffer that comprises physically divided sections that contain multiple packaging templates selected from the pre-determined set of packaging template types that are generated by the one or more packaging-production machines. Each of the packaging templates are organized within the physically divided section based upon packaging template type.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to systems, methods, and apparatus configured to process paperboard (such as corrugated cardboard) and similar fanfold materials and converting the same into packaging templates. For example, disclosed embodiments include packaging systems where custom packaging templates are generated and stockpiled within a packaging template buffer. A properly managed buffer can alleviate bottlenecks and maximize the use of packaging-production machines. Accordingly, in at least one embodiment, a custom-to-fit box can be pre-made in anticipation of receiving a particularly sized order.

Embodiments disclosed herein teach a packaging system that minimizes bottle necks within a packaging system and increase efficiency for package production machines. For example, various products can be picked from a warehouse and then delivered to the packaging system. The packaging system can then determine an optimized path for the various products to be packaged. The optimized path may leverage a packaging template buffer that is carefully managed by the computer system. Through careful management, the packaging template buffer can be leveraged to allow packaging production machines to temporarily delay the production of a packaging template until the packaging template can be concurrently produced with a second packaging template. As such, the packaging template buffer reduces waste, increase production per unit of time, and provides several other benefits that are needed in the field.

Additionally, disclosed embodiments include a packaging system that is adaptive to the flow of products and fluctuations in market activity. For example, during the holiday season shipping reaches a peak in volume. In contrast, during summer months, shipping may be in a relative lull. Disclosed embodiments optimize efficiency based upon the volume of packaging taking place. The optimization may take the form of minimizing the amount of corrugate used to generate boxes, minimizing the takt time required for packaging, or optimizing some other desirable characteristics or combination of characteristics. As used herein, "takt time" refers to a measure of the average time between the initial packaging command for one or more products and the boxing of the one or more products.

Figure 1:
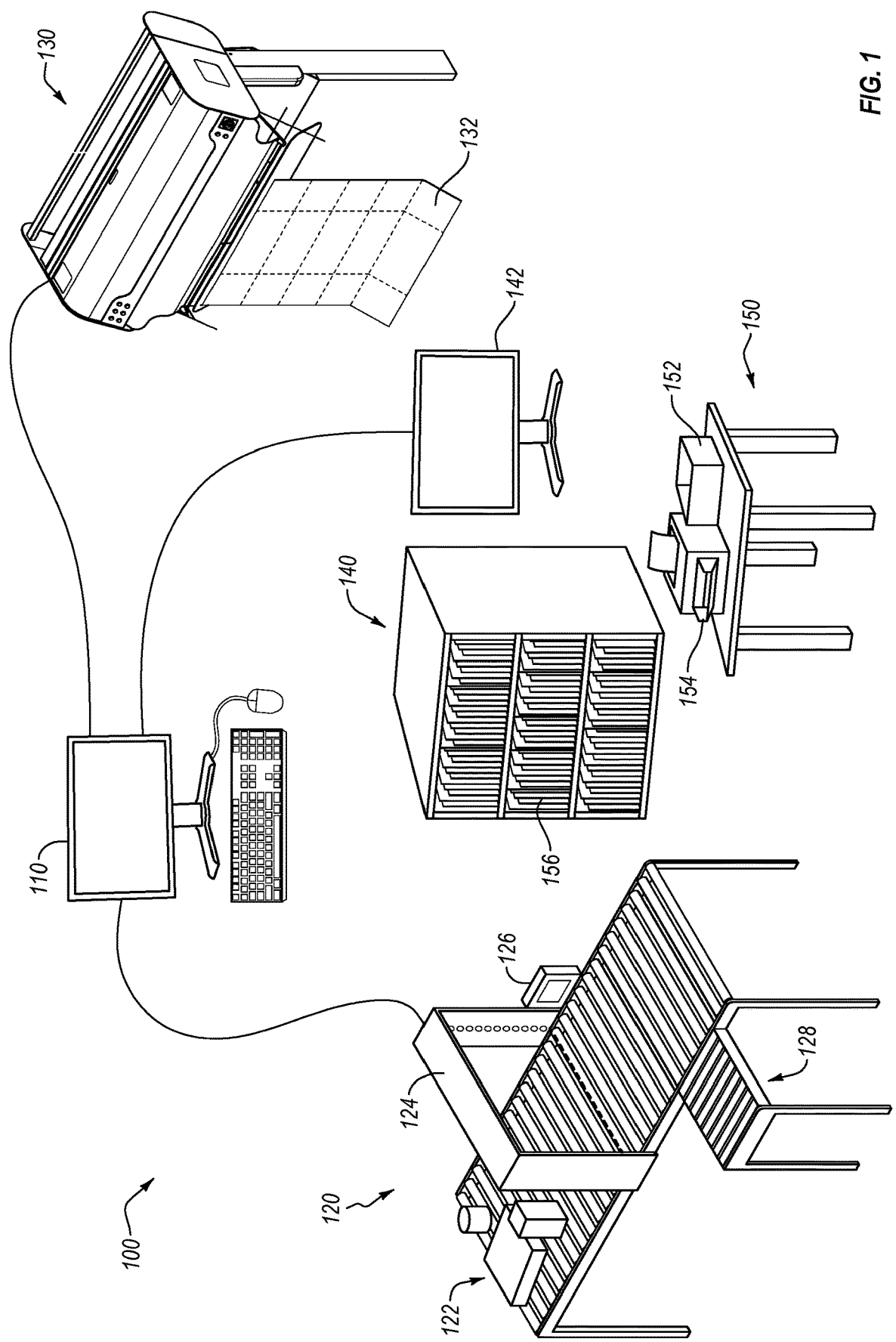
FIG. 1 illustrates a schematic diagram of an embodiment of a packaging system.

Turning now to the figures, FIG. 1 illustrates a schematic diagram of an embodiment of a packaging system 100. The depicted packaging system 100 comprises various exemplary components, including a packaging system control unit 110, a product intake system 120, a packaging-production machine 130, a packaging template buffer 140, and a packaging station 150. The various components and modules of packaging systems 100 described herein are provided only for the sake of clarity and example. One of skill in the art will understand that various alternative or additional modules or components can be used equivalently to the same effect.

In at least one embodiment, a picking system (not shown) provides a group of one or more target products 122 to the product intake system 120. The product intake system 120 comprises a conveyor belt configured to transport the target products 122 through at least a portion of the packaging system 100. Additionally, the product intake system comprises one or more scanning sensors 124. For example in FIG. 1, the one or more scanning sensors 124 comprise a light curtain. The light curtain uses various light emitters and light detectors to measure both the height and width of the target products 122.

The depicted light curtain is provided only for the sake of example. In various alternative or additional embodiments, the product intake system comprises multiple dimensional scanning sensors, such as light curtains for measuring different cross-sections of the group of one or more target products 122. Further, in additional or alternative embodiments, the product intake system 120 comprises alternative one or more dimensional scanning sensors 124 for determining the dimensions of the target products 122. For example, the one or more dimensional scanning sensors 124 may comprise a URL scanner that scans a URL associated with each of the target products within the group of one or more target products 122. The URL scanner may be in communication with a computer database (not shown) that stores the dimensions of each product based upon its URL. Additionally or alternatively, the one or more dimensional scanning sensors 124 can comprise a lidar sensor, a computer vision system, a laser distance measuring, or any other system capable of measuring dimensions. The product intake system 120 determines the overall dimensions of all the group of one or more target products 122 based upon the stored dimensions of each individual product. Accordingly, various different apparatus and systems can be used to determine the dimensions of the group of one or more target products 122.

In at least one embodiment, the product intake system 120 comprises multiple different scanners. For example, the product intake system 120 is depicted as comprising one or more dimensional scanning sensors 124 (e.g., a light curtain) and one or more group scanning sensors 126 (e.g., a URL scanner). When the group of one or more target products 122 are scanned, the one or more dimensional scanning sensors 124 generate dimension information about the products and one or more group scanning sensors 126 generate group information about the products. The dimension information provides dimensional information to the packaging system control unit 110, while the group information provides order information associated with the group of one or more target products 122. In at least one embodiment, a single sensor gathers both the dimension information and the group information.

For instance, one or more of the products may comprise a URL that is associated with the order number, products, address, special order instructions, and/or various other similar information. The group information is used to generate packaging labels for the boxes that are used to package the products. Additionally, the order information can be used to specify particular packaging features, such that the required strength of the final box.

In at least one embodiment, when the packaging system control unit 110 identifies invalid information within either the group information or the dimension information, the group of one or more products 122 are redirected towards a secondary conveyor belt 128. The invalid information can comprise missing information, incorrect information, or information that doesn't otherwise map to possible outcomes within the packaging system 100. The secondary conveyor belt 128 may correspond with a recycling system. For example, products that are placed onto the secondary conveyor belt 128 may be recycled through the product intake system 120.

Further, in at least one embodiment, the product intake system 120 comprises a scale (not shown). The scale measures the weight of the group of one or more products 122 and sends the information to the packaging system control unit 110. The packaging system control unit 110 uses the weight to determine a proper strength of a box for boxing the group of one or more products. For example, thicker corrugate may be desirable when packaging heavy items, while thinner corrugate may be more cost-effective when boxing less heavy items.

Once the product intake system 120 determines information relating to the physical dimensions of the group of one or more target products 122, the product intake system 120 communicates the information to the packaging system control unit 110. The packaging system control unit 110 may comprise a server, a desktop computer, an embedded system, a microcontroller, a cloud server, or any other computing device capable of communicating and processing information. The packaging system control unit 110 comprises a packaging database (shown in FIG. 3) that contains various information relating to the packaging production system. For example, the packaging database includes information about potential packaging templates that are available within the packaging system 100, information about packaging inventory that comprises a listing of the available number of each respective packaging template within the packaging template buffer 140, and information about a current order queue (shown as 348 in FIG. 3) that comprises information about currently pending orders that need to be boxed.

In at least one embodiment, the packaging template buffer 140 is stocked with a plurality of packaging templates that have already been manufactured and are ready to be folded into boxes. The packaging template buffer comprises physically divided sections that contain packaging templates that are organized within the physically divided section based upon packaging template type. The packaging templates within the packaging template buffer 140 are associated with a predetermined number of packaging template types. For instance, the packaging template buffer 140 may comprise one hundred different packaging template types. As such, the packaging template buffer 140 can significantly expand the number of different sized boxes that are available to a user without significantly increasing the storage costs and spaces needed to keep an equivalent number of pre-manufactured packaging templates on hand. As used herein, pre-manufactured packaging templates comprise packaging templates that are not created on-site by a packaging production machine. In at least one embodiment, pre-manufactured packaging templates comprises packaging templates that are created by a die-cut process and are not made by a packaging machine that is capable of creating custom-sized, on-demand packaging templates. As such, pre-manufactured packaging templates require significant amounts of storage space in order to maintain a stock of different template types.

The packaging system control unit 110 identifies from within the packaging database a particular packaging template type that is associated with interior dimensions that are greater than or equal to the physical dimensions of the target products 122. For example, the packaging system control unit 110 may identify that a particular packaging template type designated XXX describes a packaging template that can be constructed with specific dimensions that are greater than or equal to the physical dimensions of the target products 122.

In some cases, the packaging system control unit 110 identifies multiple packing template types that are associated with interior dimensions that are equal to or greater than the dimensions of the target products 122. In various embodiments, the packaging control system unit 110 optimizes the selection of the packaging template type based upon a best fit analysis, the lowest-costing packaging template, the packaging template type with the most stock on hand, the packaging template type with strength aspects that correlate with the target products, or some other selection criteria.

Once the packaging system control unit 110 selects a particular template packaging type, the packaging system control unit communicates a template creation command to a packaging-production machine 130. The template creation command directs the packaging-production machine 130 to create a first packaging template that corresponds with the particular packaging template type. Once the first packaging template is generated, the template creation command also directs a user to place the first packaging template into a particular physical slot in the packaging template buffer 140.

Additionally, the packaging system control unit 110 communicates a template identification command to the packaging template buffer. The template identification command indicates which packaging template should be selected from the packaging template buffer 140. In at least one embodiment, the packaging template buffer contains a second packaging template that is distinct from the first packaging template that is created by the packaging-production machine 130 but also corresponds with the particular packaging template type. Additionally, the template identification command causes the packaging template buffer 140 to display to a user that the second packaging template should be constructed into a box. Accordingly, concurrently, or nearly concurrently, with communicating to the packaging-production machine 130, the packaging system control unit 110 also communicates with the packaging template buffer 140 and the buffer display 142.

In various embodiments, the packaging template buffer 140 displays the visual indication in various different ways. For example, in at least one embodiment, a buffer display 142 depicts a visual indication that corresponds with a visual identifier on the packaging template buffer 140. Additionally, in at least one embodiment, the packaging template buffer 140 comprises light indicators embedded into the front surface of the packaging template buffer 142. The light indicators may each be associated with a particular packaging template that is stored within the packaging template buffer 140. For example, the packaging template buffer 140 may indicate the desired packaging template by causing a light indicator that is most physically proximate to the desired packaging template to emit light. As such, a user would only need to identify the packaging template nearest to the emitting light indicator. Further, in at least one embodiment, the packaging template buffer 140 comprises a printer 154 that prints out a label that is associated with both the particular packaging template and the group of one or more target products. Once the particular packaging template is constructed into a box, a user can apply the label to the box.

In at least one embodiment, the packaging template buffer 140 is adaptable such that the packaging system control unit 110 manipulates and controls the respective location of each type of packaging template within the packaging template buffer 140. For example, the packaging template buffer 140 may comprise particular physical slots that are high-capacity and/or easier to access. The packaging system control unit 110 can manipulate the packaging template buffer 140 such that high volume packaging template types are within those particular slots. For example, during a particular time period a smaller packaging template type may be most popular. The packaging control unit 110 can cause the smaller packaging template type to be placed in a desired slot by depleting the packaging templates that currently occupy the desired spot and then directing the user to place newly generated smaller packaging templates from the packaging-production machine 130 into the desired slot. Once the smaller packaging templates are within the desired slot, the buffer display 142 can direct a user to select the smaller packaging templates from the desired slot, instead of their previous slot location. As such, the packaging system control unit 110 automatically adjusts the location of packaging templates within the packaging template buffer 140.

Once a user selects the indicated packaging template from the packaging template buffer 140, the user can construct a box from the packaging template. The user can then package the group of one or more target products 122 into the box. As used herein, a user "constructs" a box from a packaging template. In contrast, a packaging-production machine 130 generates, or creates, a packaging template from corrugate material.

Accordingly, the packaging system 100 is configured to identify a particular package template that will fit the group of one or more target products 122 and then send at least two different communications. A first communication to a packaging-production machine 130 and a second communication to a packaging template buffer 140. The first communication to the packaging-production machine 130 causes the packaging-production machine 130 to generate a first copy of the particular package template. The second communication to the packaging template buffer 140 causes a visual indication to be displayed that directs a user to select a second copy of the particular package template from the packaging template buffer 140. Once the packaging-production machine 130 finishes generating the first copy of the particular package template, a user can insert the first copy of the particular package template into the packaging template buffer 140 to replace the second copy of the particular package template.

The combination of the packaging template buffer 140 and the packaging production machine 130 allows a user to utilize a large number of different packaging template sizes (e.g., 100 different packaging template types) without having to wait for each packaging template to be individually created on an as-needed basis. Additionally, the buffer provided by the packaging template buffer 140, and its associated pre-determined packaging template types, allows the packaging system 100 to optimize its work flow. For example, it may conserve considerable amounts of corrugate and money to generate two different packaging templates concurrently. For instance, when the package template buffer 140 already includes a packaging template that corresponds with the particular packaging template type, the packaging system control unit 110 delays the communication of the template creation command to the packaging-production machine until another group of one or more target products is scanned by the one or more dimensional scanning sensors. The packaging system control unit 110 then generates a template creation command (shown as 372 in FIG. 3) that directs a packaging production machine 130 to create two packaging templates concurrently, wherein the two packaging templates include the particular packaging template type.

The packaging template buffer 140 contains multiples of at least some of the packaging templates. This allows the packaging system 100 to delay the production of a replacement packaging template for the packaging template buffer 140 until it can be combined with another packaging template.

Figure 2:
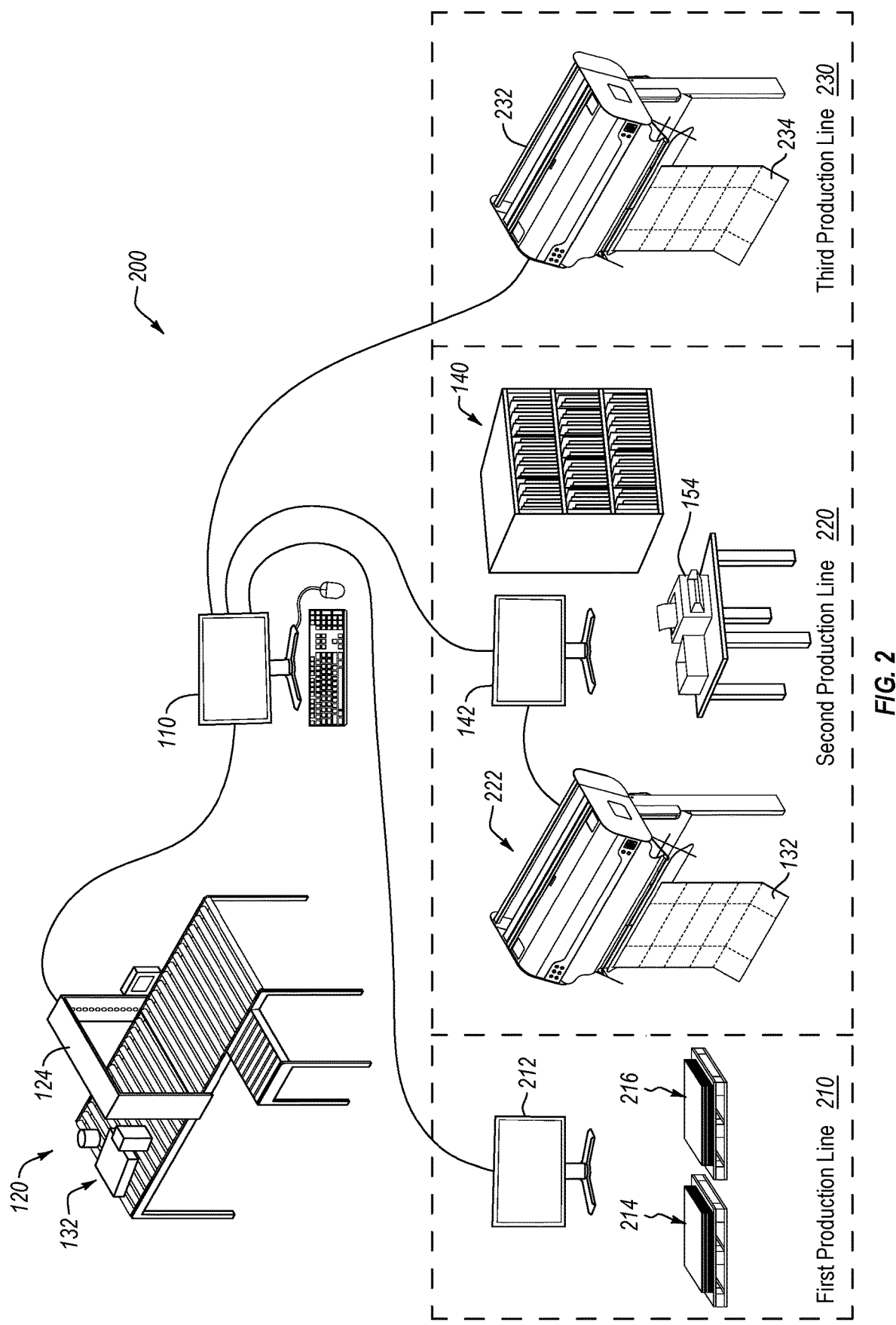
FIG. 2 illustrates a schematic diagram of another embodiment of a packaging system.

FIG. 2 illustrates a schematic diagram of another embodiment of a packaging system 200. The packaging system 200 comprises a product intake system 120 for initially processing a group of one or more target products 122. In particular, the product intake system 120 includes one or more dimensional scanning sensors 124 for measuring dimensions of the group of one or more target products 122 as described above. The product intake system 120 sends the dimension information to the packaging system control unit 110.

In contrast to the packaging system 100 depicted in FIG. 1, the packaging system 200 depicted in FIG. 2 comprises a first production line 210, a second production line 220, and a third production line 230. The number and structure of the production lines 210, 220, 230 are depicted for the sake of clarity and example. In various additional or alternative embodiments, alternate configurations and numbers of production lines 210, 220, 230 can equivalently be used.

The packaging system control unit 110 receives from the one or more dimensional scanning sensors 124 dimension information that describes the physical dimensions of the group of one or more target products 122. The packaging system control unit 110 then accesses, from within a packaging database (shown as 340 in FIG. 3), a packaging inventory (shown as 344 in FIG. 3) that comprises a listing of the available number of each respective packaging template type within the packaging template buffer 140 of the second production line 220.

The packaging template buffer 140 is stocked with a plurality of packaging templates that have already been manufactured and are ready to be folded into boxes. In at least one embodiment, the packaging template buffer 140 is associated with a predetermined number of packaging template types. For instance, the packaging template buffer 140 may be associated with 100 different packaging template types. As such, the packaging inventory comprises a listing of the number of each of the predetermined packing template types that are currently available within the packaging template buffer 140.

Additionally, the packaging system control unit 110 can access from the packaging database 340 an ordered queue that comprises information about currently pending orders that need to be boxed. For example, the product intake system 120 may comprise a conveyor belt that is long enough to concurrently carry multiple different groups of one or more target products. As such, after each respective group passes through the one or more dimensional scanning sensors 124, there may be a period of time before the scanned groups of products are boxed. During this time, each group of the one or more target products is listed within the order queue.

The packaging system control unit 110 also calculates and/or receives, from a first set of packaging production machines, takt information. The takt information describes the average amount of time required to complete one or more pending orders within the order queue. For example, the takt information may describe the average time it takes to package a group of one or more target products 122 from the time they are scanned by the one or dimensional scanning sensors 124 until they are placed within a completed box.

Disclosed embodiments efficiently and automatically determine and select optimal packaging designs to produce packaging products, such as, for example, box templates. Determining and selecting packaging designs can be based on packaging product information and defined packaging designs, and in some embodiments along with one or more of: takt information, production machine data, packaging material data, and production environment real-time considerations. Packaging production machine data includes: packaging production machine types, cost to run packaging production machines, raw material types available at packaging production machines, and design groups used to optimize packaging production at the packaging production machines. Packaging production machines can then be instructed to produce packaging products in accordance with selected packaging designs.

Using any of the above referenced information, the packaging system control unit 110 optimizes the boxing of the group of one or more target products 122 by selecting a particular packaging template type. In some embodiments, a packaging template is a corrugate cut-out of a box. The packaging template can be further manipulated, for example, folded and edges connected together, to form a box. Different types of boxes or other packaging may be used or desirable for different projects. Box size can vary based on what is being enclosed within the box. Other types of features may also be considered in determining what type and/or size box is desired for a particular use or application. Enclosing a heavy or fragile object may, for instance, dictate that a box of a certain type of material be used, or that a box that has improved protection characteristics (e.g., glue flap, integral corner protectors, full size flaps, etc.) be used.

Thus, as generally described, the packaging system control unit 110 optimizes production of packaging productions based on any number of different features or considerations. To facilitate the optimization of packaging for an object, any of a number of different designs or types of packaging may be considered. Each packaging type or design may have a different shape, style, or other feature. For example, one box design may have top and/or bottom flaps that are approximately half the width of the final box. For other box designs, the top and/or bottom flaps may be up to the full width of the box. These or other types of boxes may also include glue or staple flaps for assembly, have integrated corner protectors built into the top and/or bottom flaps, or have other features or any combination thereof.

In at least one disclosure embodiment, a hierarchy can be established within the one or more production lines (e.g., 210, 220, 230). For example, each production line may be associated with various packaging types, costs, and efficiencies. Different ranges in product dimensions and product characteristics can be associated with a hierarchical ranking across the one or more production lines (e.g., 210, 220, 230). For example, production line 230 may be associated with one or more designs that are configured for large high-strength boxes. In contrast, production line 210 may be associated with medium sized, medium strength boxes.

One of skill in the art will understand that each respective product line can be associated with a wide array of different hierarchical characteristics, including but not limited to box size, box strength, box design, production speed, production costs. Additionally, each production line may be associated with a hierarchy of box types that outline most preferred boxes to least preferred boxes, based upon cumulative analysis of the various box characteristics. In at least one embodiment, a user performs the cumulative analysis and manually ranks the packaging templates. In at least one embodiment, when determining a particular packaging template to create and a particular production line to use, the packaging system control unit 110 relies upon a hierarchical relation between identify the production line with the highest ranking packaging template that will meet the needs of the one or more target products 122.

For example, the particular packaging template type is associated with a particular production line selected from one or more production lines (e.g., 210, 220, 230). The production lines include at least a first production line 210 and a second production line 220. The first production line is associated with pre-manufactured packaging templates. The pre-manufactured packaging templates are bulk ordered and may be created off-site using a die-cut machine. As such, the pre-manufactured packaging templates may be less expensive on a per unit basis, but also have far fewer template types and require much more space than the corrugate and packaging template buffer 140 of the second production line 220.

The second production line is associated with packaging templates 132 that are produced by one or more packaging production machines (i.e., the first set of packaging production machines 222) and stored within the packaging template buffer 140. The second production line 220 provides higher customization than the first production line 210 due to the large number of different packaging template types that are available within the packaging template buffer 140. The large variety of packaging template types allows the second production lines 220 to provide finished boxes that are a much closer fit and protection to the group of one or more target products 122 than is generally possible for the pre-manufactured packaging templates within the first production line 210.

In at least one additional or alternative embodiment, the packaging system 200 also includes a third production line 230. The third production line 230 comprises a second set of packaging production machines 232 that are configured to generate custom packaging templates 234. For example, in some cases, a group of one or more target products 122 may comprise unusual dimensions that make them a poor fit for the packaging templates available within the packing template buffer 140 of the second production line 220 and the pre-manufactured text packaging templates available within the first production line 210. As such, in some embodiments, the second set of packaging production machines 232 within the third production line 230 can be utilized to create custom packaging templates on an as-needed basis.

When optimizing the boxing of the group of one or more target products 122, the packaging system control unit 110 accounts for, among other things, the current takt time within the system, the use of excess corrugate and excess space within boxes, the time of year, the needed packaging strength, aesthetic design of the packaging, and other similar variables. For example, certain times of the year may be associated with significant increases in processed orders. Typically, the holiday season is a busy time of year for many retailers and manufacturers. As such, during this time of year it may be more crucial for products to be quickly boxed and shipped.

During such times, the packaging system control unit 110 routes more groups products to the first production line 210 for packaging. The first production line 210 comprises a user interface 212 for instructing a user to construct a pre-manufactured packaging template into a box. The first production line 210 may comprise a first pallet of pre-manufactured packaging templates of a first size 214 and a second pallet of pre-manufactured packaging templates of a second size 216. As such the first packaging line 210 may comprise multiple different sizes of pre-manufactured packaging templates. The user interface 212 directs a user to select the correct size of packaging template and box the products. In various embodiments, user interface 212 may comprise a computer display, a printer, a light indicator, or any other interface capable of displaying information to a user.

Because the pre-manufactured packaging templates of the first production line 210 are produced in bulk and readily available, it is highly speed efficient to use them for packaging groups of products. Additionally, in some embodiments, because the pre-manufactured packing templates are die-cut produced and/or produced in vast quantities they are less expensive for packaging. As such, relying more heavily on the first production line 210 during busy times allows a user to package more products more quickly; however, it may also result in wasted materials and shipping space due to boxes that are excessively large.

In at least one embodiment, the packaging system control unit 110 routes groups of products to the first production line 210 when the takt information received from the second production line 220 indicates that the takt time is exceeding a takt time threshold. In selecting which groups of products to send to the first production line 210, however, the packaging system control unit 110 can also account for excess packaging space, special packaging strength requirements, packaging costs, and other various considerations.

For example, the packaging system control unit 110 using dimension information stored within the packaging database 340 and/or information received from dimensional scanning sensors can calculate a packaging excess associated with the group of one or more target products 122 and the pre-manufactured packaging templates. As used herein, the packaging excess comprises the total volume by which the interior dimensions of boxes associated with specific packaging template types exceed the dimensions of the group of one or more target products that are to be boxed. High packaging excess indicates the use of more corrugate than necessary to package the products. The excess corrugate can correspond to increased cost for having to add filler to the finished box to protect the products and increased cost in shipping the goods.

In at least one embodiment, when the packaging excess exceeds a first threshold, the packaging system control unit 110 selects a particular packaging template type that is associated with the second production line 220. Because the second production line 220 is associated with a large number of different packaging template types (e.g., a hundred different packaging template types), the products are able to be packaged in a better fitting box. Accordingly, the packaging system control unit 110 is capable of balancing packaging orders between multiple production lines 210, 220, 230 to optimize both speed and efficient use of materials.

Similarly, in at least one embodiment, the packaging system control unit 110 routes groups of one or more target products 122 to a third production line 230 based upon various different predetermined criteria. For example, the packing system control unit 110 may route products to the third production line 230 that are associated with specific dimensional characteristics, specific packaging needs, or any other need that is not addressed by templates within the first production line 210 or the second production line 220. For instance, a group of one or more target products 122 may comprise long neon light glass tubes. Due to the extreme length of these products and their fragility, the packaging system control unit 110 routes the group of products to the third production line 230 for custom made packaging templates that will tightly hold the neon light glass tubes and protect them during shipping. Accordingly, the packaging system control unit 110 can route products to the third production line 230 when no other packaging templates are available to fit the products and/or when the products are associated with packaging requirements that cannot be met by any other available packaging template.

Additionally, in at least one embodiment, the packaging system control unit 110 calculates an available-template-packaging excess associated with the group of one or more target products and available packaging templates. The available-template-packaging excess comprises the total volume by which the interior dimensions of the pre-manufactured packaging templates and the packaging templates stored within the packaging template buffer exceed the dimensions of a group of one or more target products that are to be boxed. When the available-template-packaging packaging excess exceeds a second threshold, the packaging system control unit 110 automatically optimizes the boxing of the group of one or more target products by selecting a particular packaging template type that is associated with a third production line. The third production line is associated with custom-made packaging templates that are generated on-demand based upon the physical dimensions of a group of one or more target products. As such, the packaging system control unit 110 can optimize packaging such that an upper threshold of excess corrugate is enforced.

Figure 3:
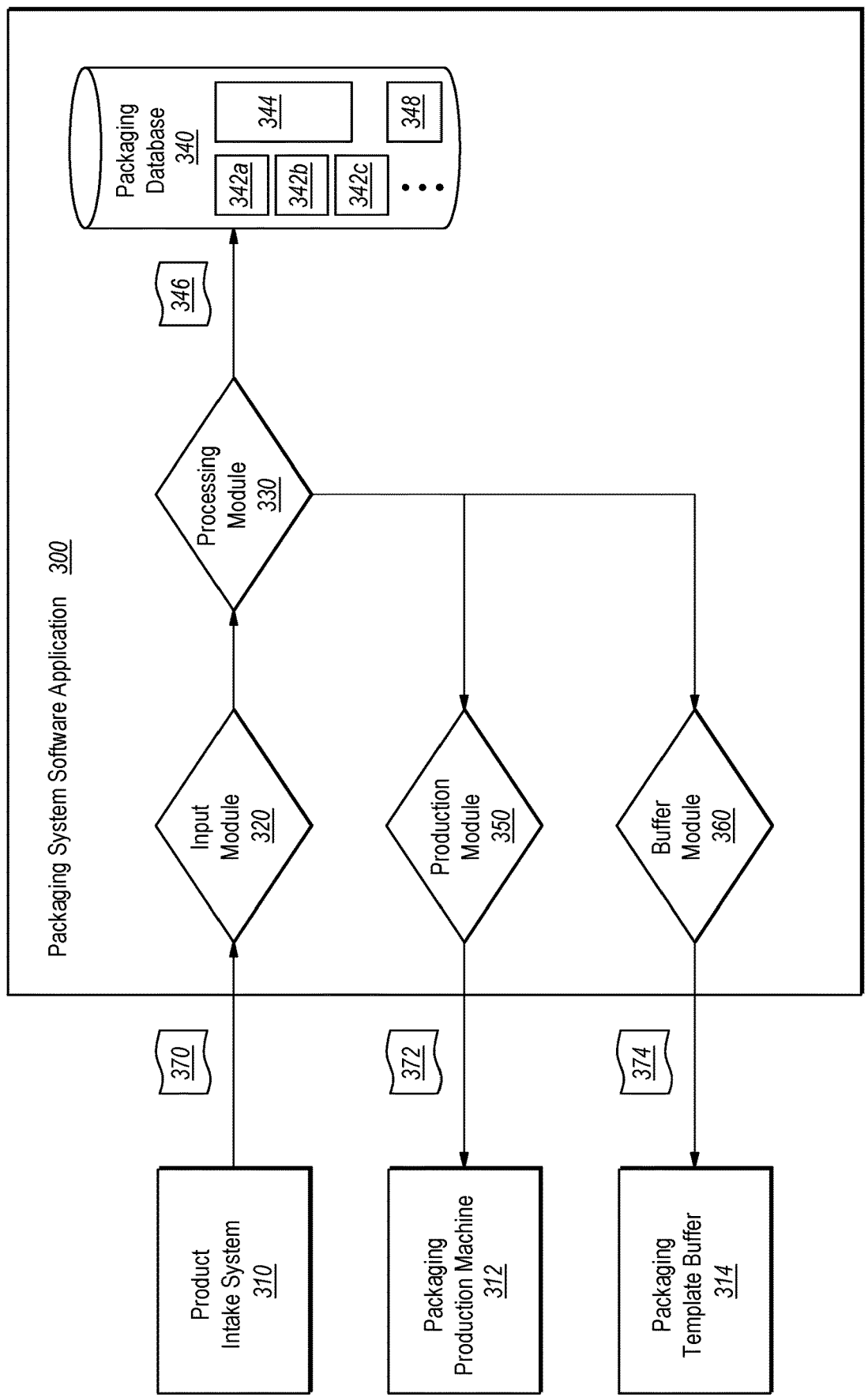
FIG. 3 illustrates a schematic diagram of another embodiment of a packaging system software application.

FIG. 3 illustrates a schematic diagram of an embodiment of a packaging system software application 300 that is configured to process and control the various communications and actions described in FIG. 1 and FIG. 2. In various different embodiments, the packaging system software application 300 is executed on the packaging system control unit 110, on a remote server that is in communication with the packaging system control unit 110, within a distributed system that includes one or more remote servers and/or one or more processors disposed within the various components of the packaging system 100, 200.

The packaging system software application 300 comprises various exemplary modules and elements, including an input module 320, a processing module 330, a packaging database 340, a production module 350, and a buffer module 360. The described modules and elements, however, do not limit the packaging system software application 300 to any particular configuration or structure. One of skill in the art will understand that the modules and elements can be otherwise arranged, divided, or combined within equivalent structures.

The input module 320 receives dimension information 370 from a product intake system 310. As described above, the product intake system 310 may comprise any system that is capable of scanning one or more target products to determine the physical dimensions of the one or more target products. The input module 320 provides the received dimension information 370 to the processing module 330.

Using the dimension information 370, the processing module 330 identifies within the packaging database 340 a particular package template 342(*a-c*) that is associated with interior dimensions that are greater than or equal to the physical dimensions of the one or more target products. The packaging database 240 comprises information about different types of packaging templates 242(*a-c*), including, in some embodiments, information about pre-manufactured packaging templates. As such, based upon information stored within the packaging database 340, the processing module 330 selects a particular package template digital file 346 based upon various information stored within the packaging database 340 and received from the product intake systems 310.

In the case that the particular package template digital file 346 is associated with a template type within the packaging template buffer 140, the processing module 330 directs the production module 350 to generate a template creation command 372. The template creation command 372 directs a packaging-production machine 312 to create the particular packaging template type. Additionally, the processing module 330 directs the buffer module 360 to generate a template identification command 374 that causes a packaging template buffer 314 to indicate which packaging template should be selected from a packaging template buffer 314.

The production module 350 then communicates the template creation command 372 to the packaging-production machine 312, and the buffer module 360 communicates the template identification command 374 to the packaging template buffer 314. In response to receiving the respective commands, the packaging-production machine 312 creates a first packaging template (shown as 132 is FIG. 1) that conforms with the template creation command, and the template identification command 374 causes the packaging template buffer 314 to display to a user a physical reference to a second packaging template (shown as 156 in FIG. 1), which also conforms with the particular packaging template type 346.

One will appreciate that embodiments disclosed herein can also be described in terms of flowcharts comprising one or more acts for accomplishing a particular result. For example, FIGS. 4 and 5 and the corresponding text describe acts in various methods and systems for high flexibility and speed box-last packaging. The acts of FIGS. 4 and 5 are described below.

Figure 4:
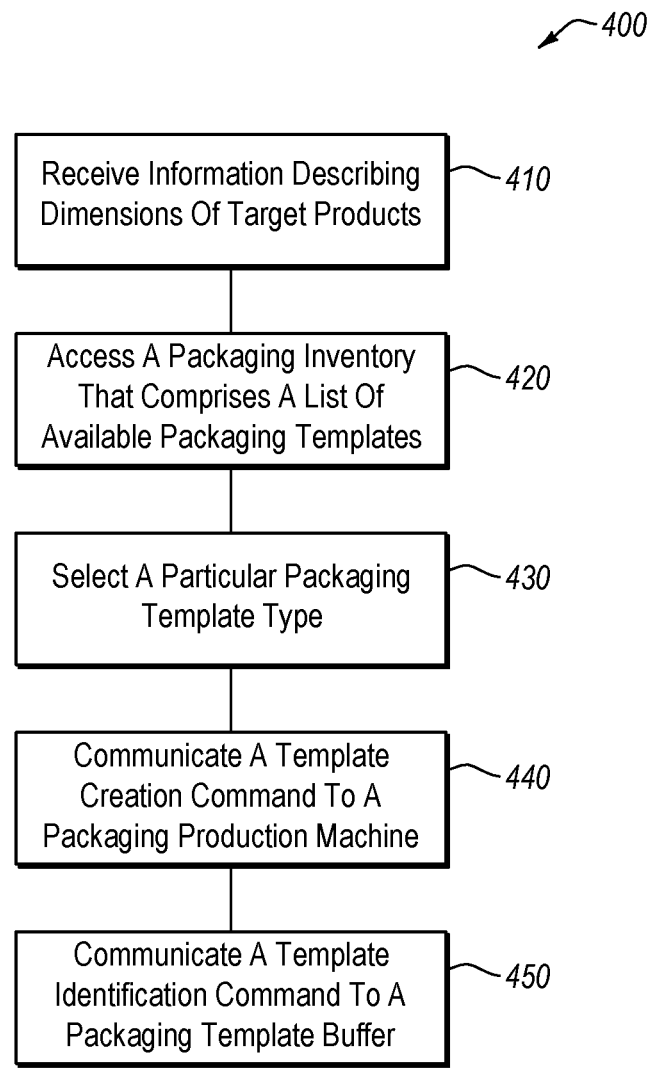
FIG. 4 illustrates a flow chart of an exemplary process for packaging items.
Figure 5:
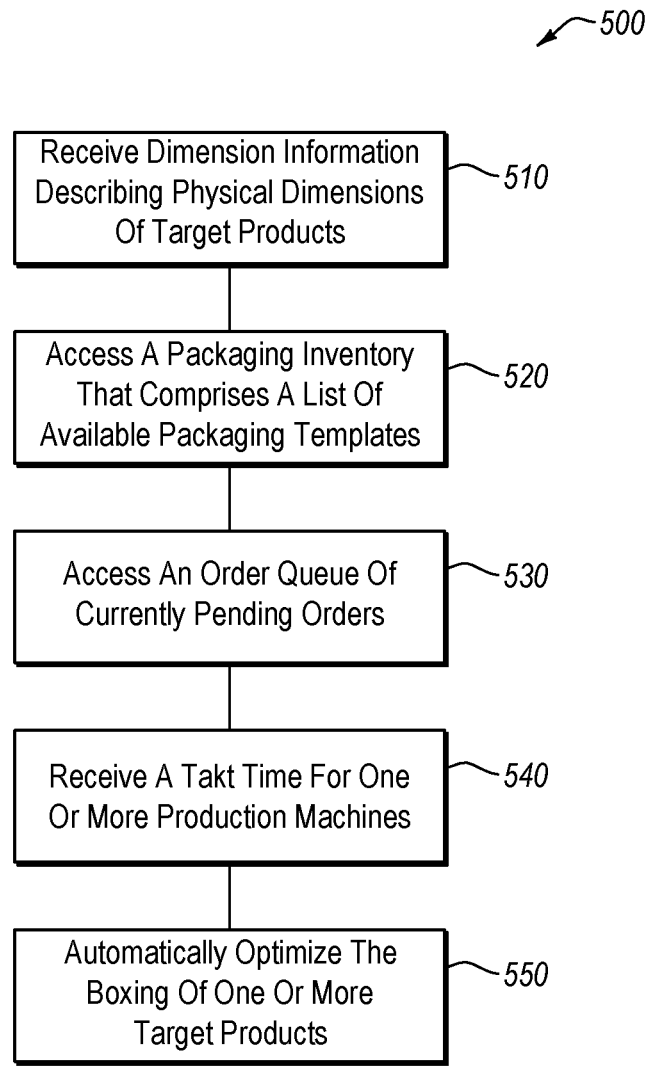
FIG. 5 illustrates a flow chart of another exemplary process for packaging items.

For example, FIG. 4 illustrates that a flow chart of an exemplary method 400 for high flexibility and speed box-last packaging includes an act 410 of receiving dimension information describing dimensions of target products. Act 410 comprises receiving, from one or more dimensional scanning sensors, dimension information describing physical dimensions of a group of one or more target products that are to be boxed. For example, as depicted and described in FIG. 3 and the accompanying description, an product intake scanner 310 communicates dimension information 370 to a packaging system software application 300.

Additionally, FIG. 4 illustrates that the method 400 includes an act 420 of accessing a packaging inventory that comprises a list of available packaging templates. Act 420 comprises accessing, from a packaging database, a packaging inventory that comprises a listing of an available number of each respective packaging template types within a packaging template buffer, wherein the packaging template buffer comprises packaging templates that are already manufactured and ready to be folded into boxes. For example, as depicted and described in FIG. 3 and the accompanying description, a processing module 230 within the packaging software application 300 accesses a packaging inventory 344 from within the packaging database 340. The packaging inventory 344 comprises information about the number of packaging templates available within the packaging template buffer 314.

FIG. 4 also illustrates that the method 400 includes an act 430 of selecting a particular packaging template type. Act 430 comprises selecting a particular packaging template type that is associated with interior dimensions that are greater than or equal to the physical dimensions of the group of one or more target product. For example, as depicted and described in FIGS. 1 and 3 and the accompanying description, the packaging system control unit 110 (which in some embodiments executes at least a portion of the packaging software application 300) receives dimension information from the one or more dimensional scanning sensors 124. The packaging system control unit 110 selects a particular packaging temple type based at least upon the dimension information and information stored within the packaging database 340.

FIG. 4 also illustrates that the method 400 includes an act 440 of communicating a template creation command to a packaging production machine. Act 440 comprises communicating a template creation command to a packaging-production machine that directs the packaging production machine to create a first packaging template that corresponds with the particular packaging template type. For example, as depicted and described in FIGS. 1 and 3 and the accompanying description, the packaging system control unit 110 communicates a template creation command 372 to the packaging production machine 312 (130 in FIG. 1).

Further, FIG. 4 illustrates that the method 400 includes an act 450 of communicating a template identification command to a packaging template buffer. Act 450 comprises communicating to the packaging template buffer a template identification command that indicates which packaging template should be selected from the package template buffer, wherein: the package template buffer contains a second packaging template that also corresponds with the particular packaging template type, and the template identification command causes the package template buffer to displays to a user that the second packaging template should be constructed into a box. For example, as depicted and described in FIG. 1 and the accompanying description, the packaging system control unit 110 communicates a template identification command 372 to the packaging template buffer 140. The template identification command 372 identifies at the packaging template buffer 140 which packaging template type should be selected and created into a box from the packaging template buffer 140. The selected packaging template is associated with the same type of packaging template type that is generated by the packaging production machine 130, but comprises a second copy.

One will understand that alternative or additional embodiments of a method for high flexibility and speed box-last packaging can comprise additional or different steps within a method. For example, FIG. 5 illustrates that a flow chart of an exemplary method 500 for high flexibility and speed box-last packaging includes an act 510 of receiving dimension information describing dimensions of target products. Act 510 comprises receiving, from one or more dimensional scanning sensors, dimension information describing physical dimensions of a group of one or more target products that are to be boxed. For example, as depicted and described in FIG. 3 and the accompanying description, a product intake scanner 310 communicates dimension information 370 to a packaging system software application 300.

Additionally, FIG. 5 illustrates that the method 500 includes an act 520 of accessing a packaging inventor that comprises a list of available packaging templates. Act 520 comprises accessing, from a packaging database, a packaging inventory that comprises a listing of an available number of each respective packaging template types within a packaging template buffer, wherein the packaging template buffer comprises packaging templates that are already manufactured and ready to be folded into boxes. For example, as depicted and described in FIG. 3 and the accompanying description, a processing module 230 within the packaging software application 300 accesses a packaging inventory 344 from within the packaging database 340. The packaging inventory 344 comprises information about the number of packaging templates available within the packaging template buffer 314.

FIG. 5 also illustrates that the method 500 includes an act 530 of accessing an order queue of currently pending orders. Act 530 comprises accessing, from the packaging database, an order queue that comprises information about currently pending orders that need to be boxed. For example, as depicted and described in FIG. 3 and the accompanying description, a processing module 230 within the packaging software application 300 accesses an order queue 348 from within the packaging database 340. The packaging inventory 344 comprises information about the number of packaging templates available within the packaging template buffer 314.

Further, FIG. 5 illustrates that the method 500 includes an act 540 of receiving a takt time for one or more production machines. Act 540 comprises receiving, from one or more packaging-production machines, takt information, wherein the takt information describes the amount of time required to complete one or more pending orders within the order queue. For example, as depicted and described in FIG. 2 and the accompanying description, the packaging system control unit 110 receives takt time information from a packaging production machine 222. The packaging production machine 22 may comprise the ability to internally track its own takt time.

Further still, FIG. 5 illustrates that the method 500 includes an act 550 of automatically optimizing the boxing of one or more target products. Act 550 comprises automatically optimizing the boxing of the group of one or more target products by selecting a particular packaging template type based upon the packaging inventory, the order queue, and the takt information. The particular packaging template type is associated with a particular production line selected from one or more production lines, the one or more production lines including a first production line that is associated with pre-manufactured packaging templates, and a second production line that is associated with packaging templates that are produced by the one or more packaging-production machines and stored within the packaging template buffer.

For example, as depicted and described in FIG. 3 and the accompanying description, the packaging system control unit 110 automatically optimizes the production of a packaging template by selecting a first production line 210, a second production line 220, or some other production line (e.g., 230). Each production line is associated with specific optimization characteristics. The packaging system control unit 110 leverages that unique characteristics of each production line 210, 220, 230 to optimize the boxing of products.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A packaging system for high flexibility and speed box-last packaging, comprising:
   one or more scanning sensors that are configured to scan a group of one or more target products that are to be boxed and gather dimension information describing physical dimensions of the group of one or more target products;

one or more packaging-production machines that are configured to generate custom-made packaging templates that conform to a pre-determined set of packaging template types, wherein the one or more packaging-production machines are configured to generate the packaging templates based upon the dimension information gathered by the one or more scanning sensors;

a physical packaging template buffer that comprises physically divided sections that contain multiple packaging templates selected from the pre-determined set of packaging template types that are generated by the one or more packaging-production machines, wherein each of the packaging templates are organized within a physically divided section based upon packaging template type; and a packaging system control unit that triggers the one or more packaging-production machines to generate a first physical packaging template that corresponds with a particular template type, wherein the particular template type comprises interior dimensions that are greater than or equal to the physical dimensions of the group of one or more target products, and concurrently triggers a visual indicator that is associated with a second physical packaging template that also corresponds with the particular template type, wherein the visual indicator indicates a location of the second physical packaging template within the physical packaging template buffer.

2. The packaging system as recited in claim 1, wherein the one or more scanning sensors comprise a light curtain.

3. A method for high flexibility and speed box-last packaging, comprising:

receiving, from one or more dimensional scanning sensors, dimension information describing physical dimensions of a group of one or more target products that are to be boxed;

accessing, from a packaging database, a packaging inventory that comprises a listing of an available number of each respective packaging template type within a physical packaging template buffer, wherein the physical packaging template buffer comprises physical packaging templates that are already manufactured and ready to be folded into boxes;

selecting a particular packaging template type that is associated with interior dimensions that are greater than or equal to the physical dimensions of the group of one or more target products;

communicating to a packaging-production machine a template creation command that directs the packaging-production machine to create a first physical packaging template that corresponds with the particular packaging template type;

communicating to the physical packaging template buffer a template identification command that provides a visual indicator indicating which physical packaging template should be selected from the physical packaging template buffer, wherein:

the physical packaging template buffer contains a second physical packaging template that also corresponds with the particular packaging template type, and the template identification command causes the physical packaging template buffer to display to a user that the second physical packaging template should be constructed into a box.

4. The method as recited in claim 3, further comprising:
when the physical packaging template buffer already includes a packaging template that corresponds with the particular packaging template type, delaying the communication of the template creation command to the packaging-production machine until another group of one or more target products is scanned by the one or more dimensional scanning sensors; and generating a second template creation command that directs the packaging-production machine to create two packaging templates concurrently, wherein the two packaging templates include the particular packaging template type.

5. The method as recited in claim 3, further comprising:
calculating a production time associated with an amount of time required to generate a potential packaging template type with the packaging-production machine; and when the production time exceeds a threshold, associating the particular packaging template type with a pre-manufactured packaging template that is associated with particular interior dimensions that are greater than or equal to the interior dimensions of the particular packaging template.

6. The method as recited in claim 3, further comprising:
receiving, from one or more weight sensors, weight information describing a weight of the group of one or more target products; and selecting the particular packaging template type that is associated with strength characteristics that exceed the weight of the group of one or more target products.

7. The method as recited in claim 3, wherein the one or more dimensional scanning sensors comprise light curtains.

8. The method as recited in claim 3, further comprising:
receiving, from one or more group-scanning sensors, group information describing order information associated with the group of one or more target products.

9. The method as recited in claim 8, further comprising:
identifying invalid information within either the group information or the dimension information; and upon identifying the invalid information, redirecting the group of one or more target products towards a secondary conveyor belt.

10. A computer system for high flexibility and speed box-last packaging, comprising:
one or more processors; and one or more computer-readable media having stored thereon executable instructions that when executed by the one or more processors configure the computer system to perform at least the following:

receive, from one or more dimensional scanning sensors, dimension information describing physical dimensions of a group of one or more target products that are to be boxed;

access, from a packaging database, a packaging inventory that comprises a listing of an available number of each respective physical packaging template type within a physical packaging template buffer, wherein the physical packaging template buffer comprises physical packaging templates that are already manufactured and ready to be folded into boxes;

access, from the packaging database, an order queue that comprises information about currently pending orders that need to be boxed;

receive, from one or more packaging-production machines, takt information, wherein the takt information describes an amount of time required to complete one or more pending orders within the order queue; and automatically optimize a boxing of the group of one or more target products by selecting a particular physical packaging template type based upon the packaging inventory, the order queue, and the takt information, wherein:

selecting the particular physical packaging template type comprises displaying a visual indicator that is associated with a particular physical packaging template that also corresponds with the physical particular template type, wherein the visual indicator indicates a location of the particular physical packaging template within the physical packaging template buffer the particular physical packaging template type is associated with a particular production line selected from one or more production lines, the one or more production lines including:

a first production line that is associated with pre-manufactured physical packaging templates, and a second production line that is associated with the physical packaging templates that are produced by the one or more packaging-production machines and stored within the physical packaging template buffer.

11. The computer system as recited in claim 10, wherein the pre-manufactured physical packaging templates are generated using a die-cut machine.

12. The computer system as recited in claim 10, wherein automatically optimizing the boxing of the group of one or more target products comprises:

selecting the physical particular template type that is associated with the first production line when the takt information indicates that a takt value is exceeding a takt threshold.

13. The computer system as recited in claim 10, wherein the one or more packaging-production machines generate custom-made physical packaging templates that conform to a pre-determined set of packaging template types.

14. The computer system as recited in claim 10, wherein the executable instructions include instructions that are executable to configure the computer system to:

calculate an available-template-packaging excess associated with the group of one or more target products and available physical packaging templates, wherein the available-template-packaging excess comprises a total volume by which the interior dimensions of the pre-manufactured physical packaging templates and the physical packaging templates stored within the physical packaging template buffer exceed the dimensions of the group of one or more target products that are to be boxed; and when the available-template-packaging excess exceeds a second threshold, automatically optimize the boxing of the group of one or more target products by selecting a particular physical packaging template type that is associated with a third production line, wherein the third production line is associated with custom-made physical packaging templates that are generated on-demand based upon the physical dimensions of the group of one or more target products.

15. The computer system as recited in claim 13, wherein the physical packaging template buffer comprises physically divided sections that contain the physical packaging templates that are organized within physically divided section based upon packaging template type.

16. The computer system as recited in claim 10, wherein automatically optimizing the boxing of the group of one or more target products comprises:

selecting the physical particular template type that is associated with the second production line when the physical packaging template buffer comprises a physical packaging template with dimensions that are greater than or equal to the physical dimensions of the group of one or more target products.

17. The computer system as recited in claim 16, wherein automatically optimizing the boxing of the group of one or more target products comprises:

calculate a packaging excess associated with the group of one or more target products and the pre-manufactured physical packaging templates, wherein the packaging excess comprises a total volume by which the interior dimensions of the pre-manufactured physical packaging templates exceed the dimensions of the group of one or more target products that are to be boxed; and when the packaging excess exceeds a first threshold, selecting a particular physical packaging template type that is associated with the second production line.

18. The computer system as recited in claim 10, wherein the executable instructions include instructions that are executable to configure the computer system to:

when the particular physical packaging template type is associated with the second production line:

communicate a template creation command to a packaging-production machine that directs the packaging-production machine to create a first physical packaging template that corresponds with the particular physical packaging template type;

communicating to the physical packaging template buffer a template identification command that indicates which physical packaging template should be selected from the physical packaging template buffer, wherein:

the physical packaging template buffer contains a second physical packaging template that also corresponds with the particular physical packaging template type, and the template identification command displays to a user that the second physical packaging template should be constructed into a box.

19. The computer system as recited in claim 18, wherein the executable instructions include instructions that are executable to configure the computer system to:

when the physical packaging template buffer already includes a physical packaging template that corresponds with the particular physical packaging template type, delay the communication of the template creation command to the packaging-production machine until another group of one or more target products is scanned by the one or more dimensional scanning sensors; and generating the template creation command that directs the packaging-production machine to create two physical packaging templates concurrently, wherein the two physical packaging templates include the particular physical packaging template type.

\* \* \* \* \*